April 15, 1952         M. F. KNOY         2,592,712
PORTABLE REFRIGERATOR
Filed April 10, 1944         3 Sheets-Sheet 1
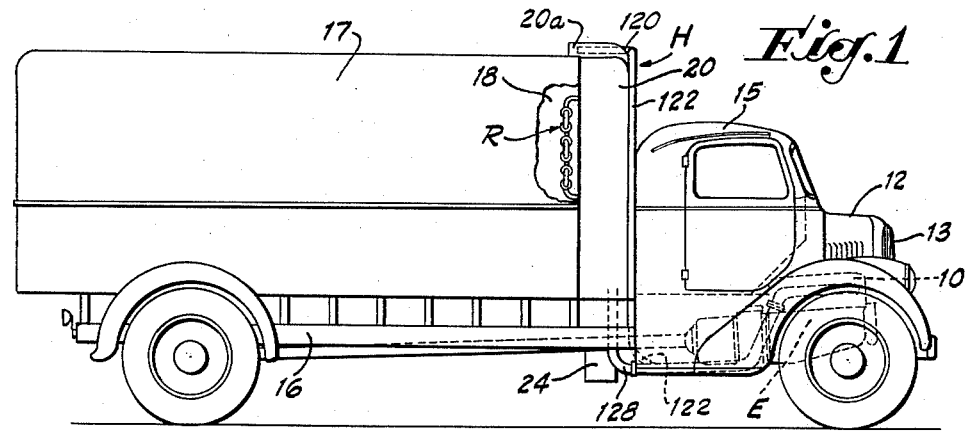
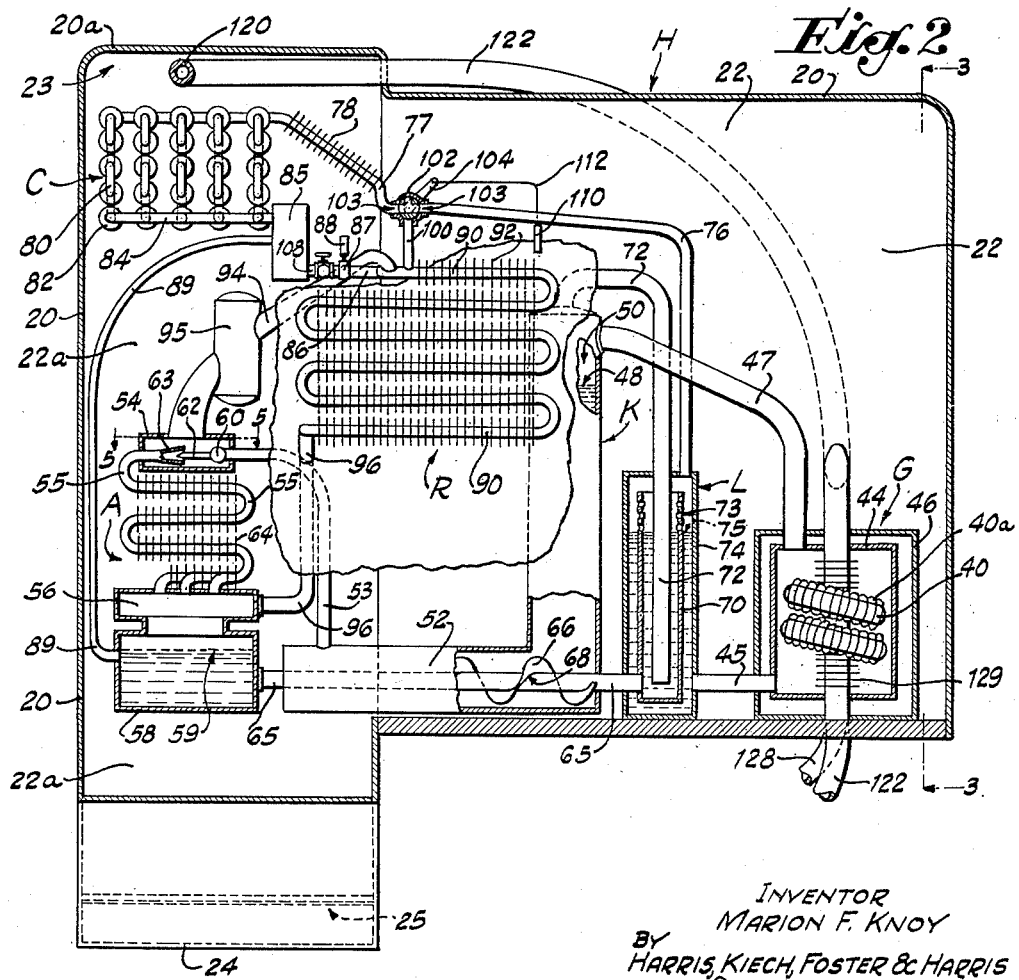
INVENTOR
MARION F. KNOY
BY
HARRIS, KIECH, FOSTER & HARRIS
FOR THE FIRM
ATTORNEYS

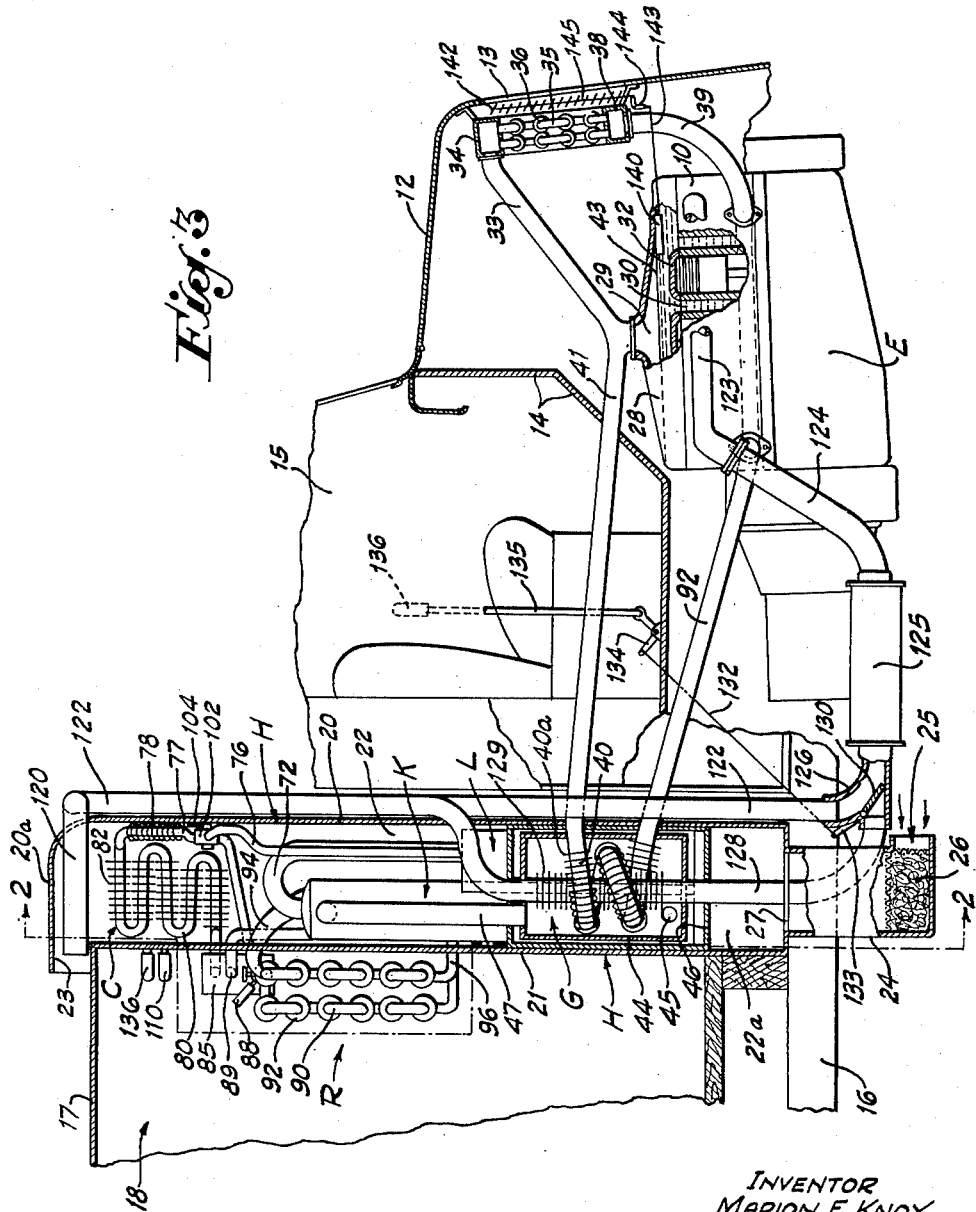

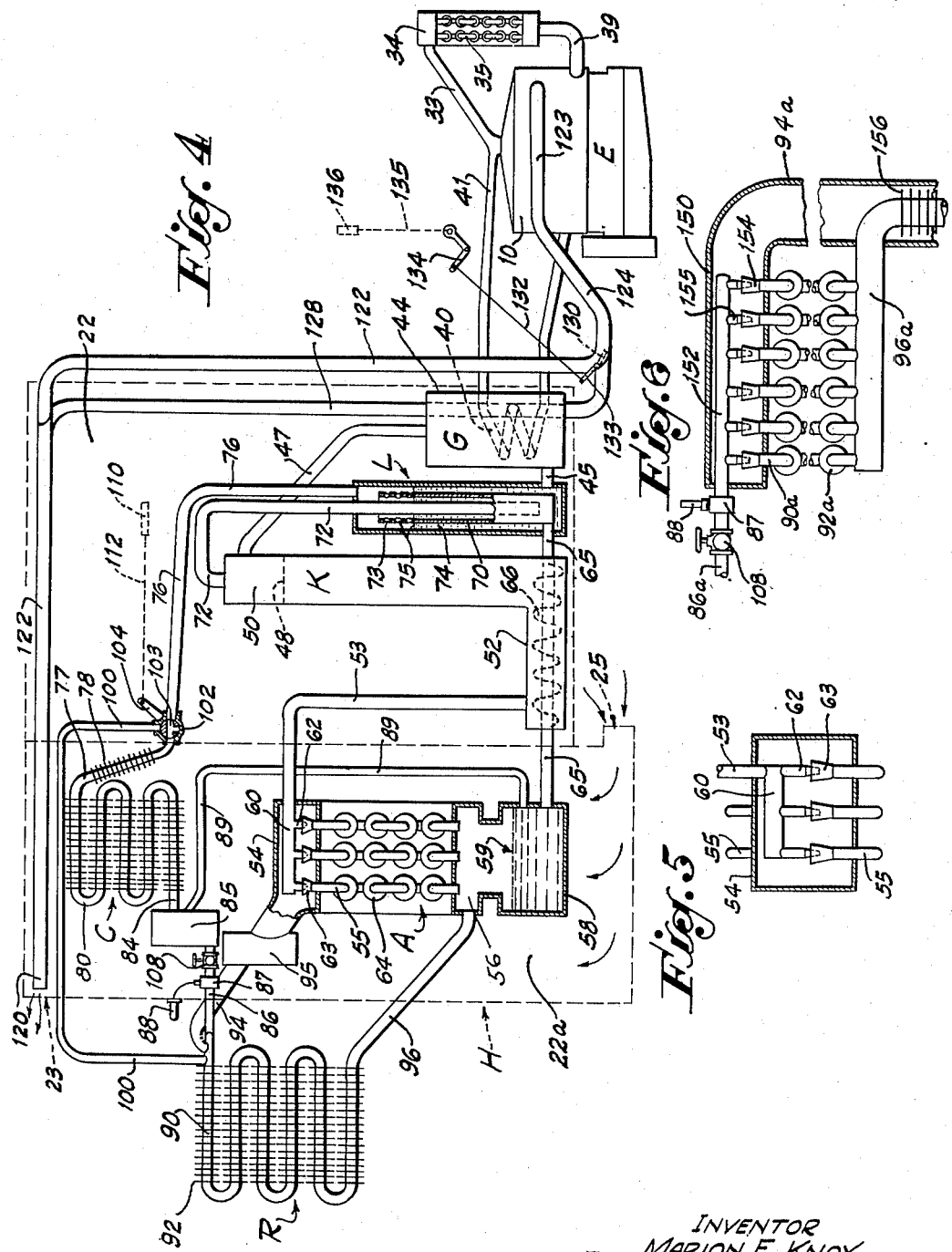

Patented Apr. 15, 1952

2,592,712

UNITED STATES PATENT OFFICE 2,592,712

PORTABLE REFRIGERATOR

Marion F. Knoy, Long Beach, Calif., assignor to
Robert T. Collier, Wilmington, Calif.

Application April 10, 1944, Serial No. 530,326

2 Claims. (Cl. 62—119.5)

This invention relates to refrigeration of the gas-absorption type wherein an absorption liquid containing a refrigerant gas is circulated in a sealed system.

This application is a continuation-in-part of my copending application Serial No. 521,354, filed February 7, 1944, which has now matured into Patent No. 2,481,520 granted September 13, 1949.

One object of this invention is to improve the gas-absorption refrigeration cycle.

Another object is to cool a refrigerator compartment of a truck or other portable device by means of the gas-absorption refrigeration cycle and utilize heat from the liquid cooling jacket of an internal combustion or other heat-generating engine as generating means for liberating refrigerant gas from the absorption liquid. In a preferred form the engine will also propel a truck or other vehicle carrying the refrigerator. It is recognized that the gas-absorption cycle has been used for refrigeration, but I am not aware that heat from a cooling liquid jacket of a heat-generating engine has been employed for energizing such systems.

To aid in an understanding of my invention, the conventional gas-absorption refrigeration cycle is briefly described as involving the steps of heating a "rich" absorption liquid to expel refrigerant gas therefrom and yield "lean" absorption liquid, condensing the gas to form liquefied refrigerant, evaporating the liquid refrigerant with the aid of hydrogen as a fixed carrier to produce refrigeration, and reabsorbing the gas in cooled lean absorption liquid. "Rich" absorption liquid is one having refrigerant gas absorbed or dissolved therein in operative proportion, usually water containing ammonia, and "lean" absorption liquid is that from which the refrigerant gas has been expelled in operation of the cycle. The conventional gas-absorption refrigeration system comprises a so-called generator into which rich absorption liquid is fed and to which heat is applied whereby refrigerant gas and a small amount of water vapor are redistilled out; an accumulator or separator into which the hot liquid and gas are conveyed and in which the gas separates from the liquid; a so-called analyzer into which separated gas usually carrying some water vapor enters and passes through rich absorption liquid passing to the generator; a rectifier through which the gas passes to remove any water vapor remaining; an elevated condenser to receive and liquefy the refrigerant gas; an elevated evaporator into which the liquefied refrigerant flows and into which an uncondensable carrier gas, hydrogen, enters, and wherein the refrigerant evaporates under the partial pressure effects of the carrier gas to produce cooling; and an absorber into the upper portion of which the lean absorption liquid is fed and into a lower portion of which cold refrigerant gas and carrier gas from the evaporator pass to rise countercurrently against the descending lean absorption liquid flowing by gravity from the accumulator, whereby the liquid absorbs the refrigerant gas with incidental heat evolution, the resultant rich absorption liquid returning by gravity from the absorber to the analyzer and flowing thence to the generator, the carrier gas rising through the absorber and returning to the evaporator circuit.

Stated briefly, one phase of the invention resides in employing heat from the cooling jacket of an internal combustion engine as the generating heat to liberate dissolved refrigerant gas contained in an absorption liquid, thereby to operate the gas-absorption refrigeration cycle and cool refrigerator compartments in trucks or passenger compartments in buses and the like. A conventional gas-absorption refrigeration cycle may be employed for the purpose if desired. However, the present invention also comprises novel features of the gas-absorption cycle itself. One of these features is the employment of a gas lift or vapor lift for elevating the rich absorption liquid to establish a head which is higher than that in the absorber, whereby to augment the feed of the rich absorption liquid to the gas-generating portion of the system. Another feature of the invention resides in the discovery that, upon supplying increased amounts of heat to meet increased refrigeration requirements, a resultant increase in the gas lift effect mentioned increases the head of rich absorption liquid in the accumulator by reason of an automatic transfer or shift of a larger proportion of the main body of rich absorption liquid from the absorber to the accumulator than occurs under lower refrigerating requirements, thereby insuring circulation of still greater amounts of rich absorption liquid and liberation of more refrigerant gas to meet effectively the higher refrigerating requirements. According to one form of the invention, this feature is accomplished by the employment of apertures or perforations in an upper portion of a stand-pipe in the gas lift device, whereby liquid may overflow from the stand-pipe through the apertures under light loads, and over the top of the stand-pipe under heavy refrigeration loads. A further improvement in this aspect of the invention resides in providing for the accumulation of excess liquefied refrigerant gas when the latter is not required to produce cooling in the evaporator or refrigerator, so that this excess liquid refrigerant will be present as a reserve when increased refrigerating requirements develop. In the event of any large excess of liquefied refrigerant, which might occur under conditions of low refrigerating requirements, the invention includes provision for the return of such large excess directly to the rich absorption liquid which, to that extent, will be fortified in order to meet quickly any increased refrigeration requirement. Under the latter condition, the excess liquefied refrigerant passing directly into the rich absorption liquid will in turn pass to the gas lift device and thence to the gas generator and condenser without performing any refrigeration in the evaporator or refrigerator. Thus, the invention also includes employing only that amount of liquid refrigerant which is necessary when refrigeration requirements are low, and storing excess amounts of liquid refrigerant for quickly meeting increased refrigeration demands when they occur.

Another feature of the invention resides in providing a by-pass around the condenser directly to the evaporator coils, so that hot gases and vapors separating from the hot liquid leaving the generator may be passed directly to the evaporator coils for quickly defrosting the same, or for supplying sufficient heat to the compartment should the atmospheric temperature become colder than desired, so as to threaten freezing, for example.

Other mechanical features of the invention include the employment of a plurality of individual jets respectively directed into the open ends of all of the various coils of both the absorber and the preferred form of the evaporator or refrigerator, whereby to distribute the lean liquid in the one instance and the liquefied refrigerant gas in the other instance uniformly into the respective coils, thereby to obtain uniform absorption in the one instance and uniform refrigeration in the other instance. Another feature of mechanical novelty is in the employment of heavily finned coils in the absorber and in the evaporator or refrigerator, and further in the employment of a helical fin having a metal bond to the internal pipe of a heat exchanger such as may be disposed between the absorber and the gas generator, whereby turbulence and high rates of heat exchange are attained.

A particular feature of the present invention resides in providing on the truck or other vehicle a separate vertically arranged chamber or stack in which especially the condenser and the absorber are positioned, and providing a forwardly directed air scoop at the bottom of the stack and a rearwardly directed air vent at the top of the stack, whereby good cooling air circulation is induced. Another feature of this phase of the invention resides in employing the exhaust gases to produce an aspirating effect at the top of the stack, this being accomplished by disposing an exhaust gas outlet or outlets adjacent the outlet of the vent so as to discharge rearwardly and further induce an upward draft through the stack by the resultant ejector or aspirating action, whereby cooling air will be circulated as long as the motor is running, whether or not the vehicle is moving.

Further features of invention are found in providing hydrogen lines of relatively large cross-sectional area whereby to reduce frictional resistance to flow of the hydrogen or other carrier gas; employing helium as a carrier gas instead of hydrogen because of its freedom from loss by seepage through iron and steel parts, thereby making it possible to use iron and steel in the system; and employing a heavier refrigerant than ammonia, preferably monomethylamine, when helium is used as the carrier gas.

In the accompanying drawings wherein certain embodiments of the invention are disclosed by way of illustration only:

Fig. 1 is a side elevation of a refrigerator truck operated by an internal combustion engine and equipped with the refrigerating improvements of the present invention;

Fig. 2 is a vertical section taken approximately on the broken line 2—2 of Fig. 3, parts being shown in rear elevation;

Fig. 3 is a fragmentary side elevation, parts being broken away, the view being taken approximately from the line 3—3 of Fig. 2, and indicating the relative arrangement on the truck of the various instrumentalities;

Fig. 4 is a flow sheet showing diagrammatically the operative relationship of all of the parts of the system;

Fig. 5 is a fregmentary cross-section taken from the line 5—5 of Fig. 2 and showing the nozzle arrangement for supplying lean absorption liquid to the various coils of the absorber; and Fig. 6 is a fragmentary elevation, partly in section, showing a modified form of evaporator or refrigerator unit.

Referring to the drawings, and especially to the flow sheet of Fig. 4, the principal parts of the apparatus shown comprise: a conventional internal combustion engine E having an engine block 10 carried on a forward portion of the truck frame; a ventilated housing H carried by an intermediate portion of the truck and enclosing a refrigerant-producing system; a generator G enclosed in said housing for liberating refrigerant gas from a gas-absorption liquid; an accumulator and separator K which receives hot lean absorption liquid and liberated gases from the generator G; a liquid collector L which receives rich absorption liquid and into which separated gas from the separator K is passed to produce a gas lift effect for establishing an elevated head of the rich absorption liquid to supply the generator G; a condenser C in which refrigerant gas from the collector L is condensed to form liquefied refrigerant; an evaporator or refrigerator R in which liquefied refrigerant is vaporized to produce a cooling effect in a refrigerator compartment on the truck; and an absorber A in which cold refrigerant gases from the evaporator R are reabsorbed in the lean absorption liquid.

The block of the engine E and its associated cooling equipment are shown as located beneath the hood 12 of the truck and between and below a front grill 13 and forward walls 14 of an operator's cab 15. A frame 16 supports a truck body comprising a body member 17 enclosing a refrigerator compartment 18, the truck body also comprising a vertically disposed housing H which is positioned behind the operator's cab 15. The housing H comprises outer walls 20 and an inner rear wall 21 which is also the forward wall of the refrigerator compartment 18. The walls 20 and 21 enclose a chamber 22 in which are placed the refrigerant-producing devices above enumerated. At one side of the chamber 22, which is the left side as viewed in Fig. 2, the top wall of the housing H is elevated to form a hood 20a which is provided with a rearwardly directed vent 23 for escape of air rising through the chamber 22. Vertically aligned with the hood 20a, an air intake device 24 is provided at the bottom of the chamber 22 and connected with the housing H, the device 24 being provided with a forwardly directed air scoop or intake 25, the air passing preferably through any suitable filter or air cleaner 26 and rising thence through an opening 27 in the bottom of the housing H into the chamber 22. In this manner an active air column or cooling stack 22a is provided in the corresponding side of the chamber 22, the column 22a thus having a good up-draft of cooling air which is utilized by placing the absorber A and the condensing means C therein as seen in Fig. 2.

For supplying heat to the generator G, advantage is taken of heat generated in the block 10 of the internal combustion engine E. For this purpose the block 10 is provided with a cylinder head 28 suitably mounted in any conventional manner and provided with a fluid chamber 29 having communication with cooling liquid passages 30 conventionally located adjacent engine cylinders 32. Extending from the top of the cylinder head 28 is a riser 33 for hot fluid, which communicates with a chamber 34 at the top of a cooler or condenser comprising a series of hairpin coils 35 provided with cooling fins 36, the coils 35 discharging into a bottom chamber 38 from which the cooling fluid is returned by a conduit 39 to the engine block 10.

In order to heat the generator G, a coil 40 provided with heat distributing fins 40a is disposed therein and is connected by means of a line 41 with the chamber 29 in the cylinder head 28, whereby hot fluid is conducted from the engine cooling system into the coil 40, the cooled fluid being returned by a line 42 to the cooling liquid passages 30 in the engine block 10. The engine cooling system just described, comprising the riser 33, the hair-pin coils 35, the passages 30 in the engine block 10, the fluid line 41, and the heating coil 40 may be either filled with a relatively non-vaporizing cooling liquid or a vaporizing liquid which will have a normal operating level at an intermediate point in the chamber 29 approximately as indicated by the line 43, this level being below the coils 35 and the heating coil 40.

The generator G containing the heating coil 40 comprises a container 44 which is supplied with rich absorption liquid by an intake conduit 45 communicating with the lower portion thereof. If desired, for purposes of heat conservation, the container 44 may be enclosed in an insulating casing or jacket 46, which also avoids overheating the chamber 22. Thus, the heated gas generator G is in this respect segregated from the succeeding gas handling devices which are the other members of the refrigerant-producing system enclosed in the chamber 22 and comprise the accumulator K, the collector L, the condensing device C, and the absorber A.

The hydrostatic head supplying liquid to the container 44 is established by a liquid level higher than the container 44. As a result, the hot refrigerant gas, for example, ammonia gas, distilled from the absorption liquid, for example, water, in the container 44, passes into an upwardly extending conduit 47 together with quantities of the liquid and a small amount of water vapor, and furnishes a gas lift effect which carries the absorption liquid to an elevated point of discharge into the accumulator K, wherein the liquid falls to establish an elevated lean absorption liquid level approximately as indicated by the line 48, thereby providing a chamber 50 for the separation of the liberated refrigerant gas and the condensation of a part of the water vapor.

The lean liquid in the accumulator K, largely denuded of gaseous refrigerant, descends into a horizontal heat exchanger 52, through which it travels to the left as viewed in Figs. 2 and 4 and thence rises through a conduit 53, from which it is injected into a header 54 at the top of the absorber A.

The absorber A includes, in addition to the header 54, a series of hairpin coils 55, the loops of which extend transversely, each coil being vertically disposed and descending step by step from the header 54 to a gas receiving chamber 56 located above and connected with a liquid receiver 58 which constitutes a storage receptacle for enriched absorption liquid, the liquid normally having an operating level approximately as indicated by the dotted line 59. For supplying lean liquid to the absorber A, the upper end of the conduit 53 is horizontally disposed so as to serve as a manifold 60, as shown in Figs. 2 and 5, which manifold is provided on one side with a series of nozzles 62 which are directed to jet the lean liquid into the adjacent open ends of the coils 55, which, if desired, may be flared as shown at 63. In this manner the lean absorption liquid builds up a back pressure under which it is jetted through the nozzles 62 into streams of ammonia gas and hydrogen, or ammonia gas and helium, being fed into the chamber 56 after leaving the evaporator R as presently to be described.

By jetting the lean absorption liquid from the nozzles 62 into a series of streams of rising refrigerant and carrier gas, a high degree of contact between the rising gases and the jetted lean liquid is produced so that good absorption of the refrigerant in the liquid is obtained, thereby yielding a rich absorption liquid containing in solution substantially all of the refrigerant. A particular advantage of the method of supplying each absorber coil individually with weak absorption liquid is that it insures a more even distribution of the liquid among the various coils than could be secured by gravity flow alone. In a vehicle traversing uneven roads, first one end and then the other end of the liquid supply manifold would be higher, with the result that most of the lean liquid would tend to run down into the first coil encountered, thus gorging some coils and starving others, under varying conditions.

Since absorption of the refrigerant gas by the lean absorption liquid presents an exothermic phenomenon, it is desirable to provide for good cooling. For this reason, each of the coils 55 is well provided with fins 64 which assist in carrying heat from the gases and liquids in the coils to the air stream rising upward in the stack or air column 22a from the air intake 25 to the air vent 23, in which column 22a the absorber A is disposed below the condensing means C for the purpose indicated.

The body of rich absorption liquid normally accumulated in the receiver 58 of the absorber A and standing approximately at the level 59 passes from the receiver 58 through a line 65 which is disposed in heat exchanging relation with warm lean absorption liquid in the heat exchanger section 52, whereby the rich absorption liquid is correspondingly warmed. This heat exchange effect may be enhanced by the provision of a helical fin 66 secured on the wall of the line 65 by suitable metal bonding, such as welding or soldering, as indicated at 68, the helix creating turbulence and the metal bond insuring good heat conduction to improve the heat exchange between the two liquids. The line 65 leads the warm rich absorption liquid from the heat exchanger 52 into the lower end of a standpipe 70 centrally located in the liquid collector L and constituting a portion of a gas lift device to raise rich absorption liquid above the normal level 59 in the receiver 58 of the absorber A and thereby to establish a high liquid level and consequent hydrostatic head in the collector L.

In order to produce the gas lift effect and maintain a higher liquid level, a gas and vapor conducting pipe 72 leads from the top of the accumulator K and downward through the top of the collector L into the bottom of the stand-pipe 70, where it discharges into the liquid body at a point below the liquid level 59 of the receiver 58. The diameter of the depending pipe 72 compared with the diameter of the stand-pipe 70 is such that the quantity of gases being expelled by the gas pressure in the accumulator K from the lower end of the pipe 72 is sufficient to produce a gas lift effect in the stand-pipe 70 which thereby becomes a gas lift chamber, whereby to elevate liquid into the upper end of the stand-pipe 70, whence it passes through apertures 73 into an outer annular chamber 74 in the collector L and tends to establish therein a liquid level approximately indicated by the line 75 when operating under normal conditions, whereby a head of warm rich absorption liquid is created in the collector L to supply liquid continuously to the container 44 of the generator G under the resultant hydrostatic pressure. The perforations 73 in the upper end of the stand-pipe 70 permit liquid which is elevated by gas lift during normal operation of the evaporator R under light refrigeration requirements to flow out therethrough to establish the liquid level 75. However, when refrigeration requirements become heavy and increased amounts of heat are applied to the generator G, as hereinafter disclosed, the gas lift in the collector L increases and the volume of warm, rich liquid rising in the stand-pipe 70 increases to a point at which all of it cannot escape through the perforations 73, the result being that the excess rises and overflows from the top of the stand-pipe 70 into the annular chamber 74 and thereby establishes a higher liquid level and consequently greater hydrostatic pressure which feeds a correspondingly increased quantity of the rich absorption liquid to the generator G.

Thus, the present system establishes a liquid level in the collector L at 75 or at a higher level, which is higher than the level 59 in the receiver 58, and the liquid level 48 in the accumulator K is established at a higher level higher than that in the collector L and higher than the discharge point of the lean absorption liquid into the header 54 of the absorber A, the one liquid level being established by the gas lift effect in the stand-pipe 70 and the other being accomplished by means of the gas lift effect in the conduit 47 leading from the generator G to the accumulator K. The gas lift effect in the stand-pipe 70 has the further function of supplying additional pre-heat to the incoming rich absorption liquid by reason of the hot gases and vapors passing through the pipe 70 from the accumulator K. This contact of the hot gases and vapors with the relatively cool rich absorption liquid within the stand-pipe 70 serves also to condense out some of the water vapor that may be carried over with the gas from the accumulator K.

The rich refrigerant gases and vapors which accumulate in the top of the collector L rise therefrom through a pipe 76, the upper portion of which is inclined, whence normally they pass through an inclined line 77 and thence to the condenser C. The line 77 carries cooling fins 78 which assist in lowering the temperature of the gases in the line 77 so that any small amount of water vapor that may be carried over with the gas from the collector L will be condensed, the inclination of the pipe 76 and line 77 returning such condensed water back into the collector L by way of the pipe 76, and thereby acting to that extent as a rectifier for the gases to remove final traces of water vapor therefrom before they pass into the condenser C.

The condenser C, which receives the rectified gases from the line 77, is located in the upper end of the cooling stack or air column 22a adjacent the air vent 23. The condenser C is shown as being a series of hairpin coils 80 liberally provided with cooling fins 82, the coils 80 extending back and forth across the column 22a to insure good cooling by the air currents rising therethrough.

Under the pressure and temperature conditions of the system, refrigerant gas, such as ammonia gas, passing through the coils 80 of the condenser C, is condensed into liquid which flows from the lowermost coil 80 through a conduit 84 into a liquid refrigerant accumulating vessel 85, from which the liquefied refrigerant flows through a conduit 86 to the evaporator R in the refrigerating compartment 18. The amount of refrigerant flowing through the conduit 86 is regulated by a valve 87 controlled by a thermostat 88 suitably mounted in the compartment 18 adjacent the evaporator R. If excess liquefied refrigerant accumulates in the vessel 85 so as to overflow therefrom, it passes through a relatively small conduit 89 and is introduced into the rich gas absorption liquid in the receiver 58 of the absorber A. Liquefied refrigerant which is passed by the valves 87 flows into the uppermost coil of a series of coils 90 which constitute the evaporator or refrigerator R located in the refrigerator compartment 18. The evaporation of the liquefied refrigerant in the coils 90 produces refrigeration in the coils with consequent cooling of the compartment 18. To render the cooling effect more efficient, the coils 90, which are shown as hairpin coils, may be provided with fins 92 liberally distributed thereon to hasten heat exchange.

Evaporation of the liquefied ammonia or other refrigerant introduced into the uppermost coils 90 from the conduit 86 is accomplished by the introduction of a stream of helium or hydrogen gas, or other appropriate carrier gas, into the uppermost coils 90 from a carrier gas line 94 of large capacity which conducts carrier gas from the top of the header 54 of the absorber A by way of a carrier gas storage vessel 95. When the carrier gas stream from the line 94 passes into contact with the liquid refrigerant in the uppermost coils 90, the liquid refrigerant evaporates by reason of the consequent partial pressure condition established in this portion of the system. The result is refrigeration.

From the lowermost coils 90 of the evaporator R, a mixture of cold ammonia gas and carrier gas returns by a conduit 96 to the gas receiving chamber 56 in the intermediate portion of the absorber A, whence the cold refrigerant gas and carrier gas rise through the hairpin coils 55 in countercurrent contact with the lean absorption liquid entering these coils from the manifold 60 and the nozzles 62 in the header 54. In this manner, the refrigerant gas is reabsorbed to produce fresh rich absorption liquid for repetition of the cycle, the carrier gas being separated from the refrigerant and returned to the refrigeration zone. It will be noted that the header 54, the carrier gas storage vessel 95, and the carrier gas line 94 are shown as of relatively large cross-sectional areas with respect to the conduits for handling other gases and liquids, the purpose of these greater cross-sectional areas being to reduce to the frictional contact of the carrier gas in its passage back to the refrigeration zone in the uppermost coils 90, whereby to produce relatively rapid flow of the carrier gas and to establish a draft or wind thereof to insure good evaporation of the liquefied refrigerant and correspondingly good refrigeration in the coils 90.

Provision is made for quickly defrosting the refrigerator coils 90 by employing means adapted to by-pass the condenser C and cut it out of the system temporarily. In the form shown in the drawings, a by-pass conduit 100 is adapted to be connected with the upper end of the gas and vapor pipe 76 by means of a three-way rotary valve 102, the valve body having a T-shaped passage 103 adapted to connect the pipe 76 with the line 77, as shown in Figs. 2 and 4, when the coils are used for refrigeration purposes, and adapted to be rotated about 90° from the position shown so as to connect the upper end of the inclined portion of the vapor pipe 76 with the by-pass conduit 100 whereby hot gases and vapors rising through the pipe 76 from the collector L will enter the by-pass conduit 100. The other end of the conduit 100 leads into the uppermost coils 90 of the evaporator R. Rotation of the body of the valve 102 may be accomplished when desired by manipulating a lever 104. At the time that the valve 102 is rotated to convert the coils 90 into heating coils, it may be desirable to close the liquefied refrigerant conduit 86, and this may be done by means of any appropriate valve 108 located in the conduit 86. Thus, when the coils 90 are employed as refrigerating coils, the valve 108 is open, but when the coils 90 are to be heated, the valve 108 is closed.

During periods when the coils 90 are heated, the carrier gas, hydrogen or helium, tends to accumulate in the storage vessel 95 and in the header 54 and the line 94 connected therewith. Refrigerant and water, which are condensed in the coils 90, leave the lowermost coil and flow by gravity through the return line 96 into the gas receiving chamber 56 of the absorber A, whence the liquefied portions drop down into the receiver 58, and uncondensed gases rise through the absorber tubes 55 in contact with the descending lean absorption liquid supplied by the manifold 60. In this manner, condensed or liquefied refrigerant is returned directly into the rich absorption liquid in the receiver 58 of the absorber A, thereby increasing the refrigerant concentration therein in preparation for handling the increased refrigeration load which will be imposed upon the system after defrosting has been completed and the refrigerating operation has been resumed.

According to one form of the invention it is desired to provide for employing the coils 90 of the evaporator R not only for the purpose of defrosting the coils, but also for converting them into a heater for warming the storage compartment should the outside atmosphere become too low and threaten freezing, or for heating a passenger compartment of the vehicle, or for heating passenger compartments of buses and the like. For such purposes, the valve 102 is desirably conected to a thermostat 110 in the compartment 18 or similar compartment through the medium of any suitable operating connection 112 leading to the lever 104 or other means for actuating the valve 102. Under these circumstances the valve 108 also may be thermostatically controlled if desired. In this manner, the apparatus is made completely automatic so that temperatures are prevented from rising objectionably high, and likewise from falling objectionably low.

The cooling effect of the rising air column 22a upon the coils 55 of the absorber A and the coils 80 of the condenser C, and also upon the rectifier provided by the gas line 77 and its fins 78, may be enhanced by forcing the draft through the column 22a as by a fan or by employing the exhaust gases from the engine E to produce an aspirator or ejector effect in the air vent 23. As shown, this is accomplished by positioning the end 120 of an exhaust pipe 122 horizontally in the hood 20a above the air column 22a so that it projects rearwardly and terminates just within the air vent 23 approximately as shown in Fig. 3. In this manner an air circulation is induced upward through the air column 22a to assist the force of the air current entering through the air intake 25. The exhaust pipe 122 may be connected in any desired manner with an exhaust manifold 123 on the engine E, as by means of a conduit 124 leading to a conventional muffler 125.

The exhaust from the engine E may also be relied upon when necessary to supply auxiliary heat to the generator G to meet increased refrigeration requirements. This may be accomplished by employing a three-way valve body 126 which is connected with the exhaust pipe 122 and with the muffler 125. One branch of this valve body 126 is connected with a branch exhaust pipe 128 which carries heat distributing fins 129 and rises through the container 44 of the generator G and then passes through the outside wall 20 of the housing H to return to the exhaust pipe 122. In order to regulate the flow of exhaust gases through the branch pipe 128 as required by refrigeration demands, a butterfly valve 130 is placed in the valve body 126 at the juncture of the branches leading to the pipes 122 and 128. The valve 130 is adapted to be thermostatically actuated as by means of a rod or cable 132 connected with an arm 133 outside the valve body 126 and carried by the valve 130, the rod 132 being also connected with a bellcrank 134 preferably actuated through a connection 135 from a thermostatically controlled device 136 in the refrigerating compartment 18. In this manner, as much heat may be diverted from the exhaust pipe 122 into the branch pipe 128 as may be required to augment the heat supplied by the heating coil 40.

For purposes of controlling the temperature of cooling fluid in the engine block 10, a control 140 in the form of a thermostat or pressurestat is placed in the head 28 where it is located in the liquid if it is a thermostat and cooling liquid is circulated, or where it is in the vapor if a vapor cooling system is employed. This control 140 is connected with adjustable louvers 142 which are disposed in front of the cooling coils 35 and are moved as by means of any appropriate linkage 143 between the control 140 and a bellcrank 144 which moves an actuating rod 145 connected with each of the louvers 142, whereby the control device 140 automatically adjusts the position of the louvers 142 and thereby regulates the amount of air which passes through the cooling coils 35. In this manner the temperature of the vapors or of the liquid circulating through the fluid line 41, the heating coil 40 and the engine block 10 is maintained within desirable operating limits.

In Fig. 6 of the drawings there is shown a preferred modification of the construction of the evaporator R. In general, this conforms with that shown in Figs. 2 and 3, in that a plurality of vertically arranged, transversely extending hairpin coils 90a provided with fins 92a are employed, and a large carrier gas line 94a and a liquefied refrigerant conduit 86a both feed the coils 90a, the flow of liquid refrigerant being controlled by the valve 108 and the valve 87 which is regulated by the thermostat 88. However, the upper end of the carrier gas line 94a is arranged in the form of an elongated header 150 which receives a manifold 152 in the form of an extension of the liquid refrigerant conduit 86a. The header 150 also receives the upper ends of the coils 90a, these upper ends being flared at 154 and in turn receiving respectively the tips of a plurality of nozzles 155 carried by the manifold 152. As in the case of the nozzles 62 feeding into the flared ends 63 of the coils 55 of the absorber A, the liquid supplied by the nozzles 152 is evenly distributed among the coils 90a. Thus, uniformity of contact is assured between hydrogen also entering the coils 90a through the flared ends 154, and jets of the liquid refrigerant leaving the nozzles 155. This arrangement provides for maximum evaporation and utilization of the refrigerating power of the liquid refrigerant. All the coils 90a discharge their resultant cold mixture of refrigerant gas and carrier gas into a receiving line 96a arranged as a receiving header at the bottom of the evaporator unit. Line 96a passes into the large carrier gas line 94a and is directed downwardly therethrough and provided with fins 156 for absorption of heat from the stream of rising carrier gas passing to the gas header 150 preparatory to performing its evaporating function on the liquefied refrigerant.

In addition to the statements of operation of the various portions of the system as given in connection with the foregoing description of the apparatus, the following outline of the operation of the system as a whole is provided.

Heat applied to the heating coil 40 of the generator G to liberate refrigerant gas from the gas absorption liquid in the container 44, whereby the gas absorption refrigeration system is energized, is derived from the cooling fluid which is heated in the passages 30 constituting a cooling jacket of the engine block 10 of the engine E. The heat thus imparted in the generator G to the gas absorption liquid and the refrigerant gas liberated therefrom is eventually dissipated to the atmosphere. This is accomplished by disposing the condenser C which produces liquefied refrigerant, and the absorber A in which vaporized refrigerant is later reabsorbed in the absorption liquid, in a draft of cooling air which is provided as an up-draft in the air column or cooling stack 22a disposed at one side of the chamber 22. The air up-draft in column 22a is established in part by the natural tendency of the air to rise which has been heated by contact with the absorber A and the condenser C; in part by the air current passing into the air intake 25 when the vehicle is moving forwardly; and in part by the forced draft produced by the aspirator effect of the exhaust gases leaving the rearwardly directed end 120 of the exhaust pipe 122, the discharge opening of the pipe end 120 being so disposed in the air vent 23 under the hood 20a as to induce an artificial draft by an ejector action which is assisted somewhat when the vehicle moves forwardly by reason of the rearward facing of the air vent 23.

Following production of liquefied refrigerant in the condenser C and its vaporization in the evaporator R to produce refrigeration in the refrigerator compartment 18, rich absorption liquid is produced in the absorber A by causing lean absorption liquid from the accumulator K to enter the upper end of the absorber tubes 55, as heretofore explained, and pass downwardly therein in counter-current relation to rising refrigerant gas and carrier gas. The resultant rich absorption liquid accumulates in the receiver 58 of the absorber A to establish a liquid level approximately as indicated by the dotted line 59. From the receiver 58, the fresh rich absorption liquid passes through the heat exchanging line 65 in the heat exchanger 52, whereby the rich absorption liquid is warmed by indirect heat exchange with the hot lean absorption liquid passing from the lower part of the accumulator K through the heat exchanger 52 to the outlet conduit 53 by which it is passed to the header 54 of the absorber A. This heat exchange is facilitated by the turbulence produced by the helical fins 66 secured on the line 65. The warmed rich absorption liquid flowing from the line 65 enters the lower portion of the stand-pipe 70, where it is picked up by hot gases and vapors issuing from the lower end of the depending vapor pipe 72 leading from the top of the accumulator K and is elevated by the gas lift effect of the hot gases into the upper portion of the stand-pipe 70, whence it passes into the annular chamber 74 of the collector L to establish a liquid level such as indicated by the dotted line 75. Under conditions of light refrigeration load, when the gas lift effect is relatively light, the liquid raised by gas lift will flow out through the perforations 73 in the top of the stand-pipe 70, but under conditions of heavy refrigeration load, or when large quantities of the heat are being applied to the generator G to liberate larger proportions of hot gases and vapors, the gas lift effect will be greater, and the perforations 73 may not be able to accommodate the liquid elevated in the stand-pipe 70, with the result that the excess liquid will overflow the top of the stand-pipe 70 and tend to establish a higher liquid level and consequent greater hydrostatic head in the annular chamber 74. This condition may exist when greater amounts of heat are supplied by the coil 40 than are required for ordinary refrigeration demands, or when auxiliary heat is required to be supplied through the branch exhaust pipe 128 to meet increased refrigeration demands. One of the results of the overflowing of the top of the stand-pipe 70 and the establishment of a higher liquid head in the collector L is to transfer a greater proportion of rich absorption liquid from the receiver 58 into the upper portion of the collector L above the level indicated at 75, where it is directly available to feed greater quantities of rich absorption liquid to the generator G by way of the feed connection 45.

The required refrigerant gas is liberated in the generator G by application of heat to the heating coil 40 (and to the branch exhaust pipe 128 when required) as previously described. The refrigerant gas, for example, ammonia gas, so liberated and the accompanying hot absorption liquid rise in the container 44 and thence pass upward by gas lift effect of the liberated gas through the conduit 47, whence they discharge into the top of the accumulator K. The liberated refrigerant gas and some water vapor separate from the lean absorption liquid which falls into the chamber 50 and establishes the liquid level 48, which liquid level is higher than the liquid level in the collector L, the latter in turn being higher than the liquid level 59 in the receiver 58 of the absorber A.

Hot gases and uncondensed water vapor separated in the top of the accumulator K pass by way of the vapor conducting pipe 72 down into the stand-pipe 70 to perform the above-described gas lift effect for elevating the rich absorption liquid into the collector L. During the gas lift operation in the stand-pipe 70, contact of the hot gases and vapors from the pipe 72 with the relatively cool rich absorption liquid in the stand-pipe 70 causes concentration of most of the water vapor, but at the same time liberates additional quantities of refrigerant gas from the incoming rich absorption liquid from the absorber A. The combined refrigerant gas and remaining water vapor accumulate in the top of the collector L and rise therefrom through the gas and vapor pipe 76, whence they continue through the passage 103 in the rotary valve 102 into the gas and vapor line 77 which feeds the coils 80 of the condenser C. Any water remaining in the hot refrigerant gas is condensed in the line 77, such condensation being aided by the fins 78, the condensate flowing by gravity due to the inclination of the line 77 and the vapor pipe 76 back to the collector L. The water-free refrigerant gas passes through the coils 80 of the condenser C and is thereby liquefied, preparatory to performing the refrigeration function.

The liquefied refrigerant, e. g., ammonia, flows from the lowermost coil of the condenser C into the refrigerant storage vessel 85, from which it passes by way of the conduit 86 through the valves 108 and 87 to the top coils 90 of the evaporator R, in which it meets the stream of carrier gas, such as hydrogen or helium, being discharged across the liquefied refrigerant from the carrier gas line 94 leading from the storage vessel 95 which communicates with the header 54 at the top of the absorber A. As the liquefied refrigerant and carrier gas flow through the coils 90, the liquefied refrigerant evaporates due to the partial pressure effect and produces refrigeration in the coils 90, thereby cooling the compartment 18 in which they are located.

The resultant cold refrigerant gas and carrier gas leaving the lowermost coils 90 flow through the line 96 to the gas receiving chamber 56 in the absorber A, whence they pass upward through the absorber coils 55 in countercurrent contact with the descending lean absorption liquid for reabsorption thereby to produce fresh rich absorption liquid for repetition of the cycle. The carrier gas line 94 and the line 96 for refrigerant gas and carrier gas have relatively large cross-sectional areas in order to provide a relatively frictionless path for the gases, and especially for the carrier gas passing to the evaporator coils 90.

When liquefied refrigerant is produced in the condenser C in quantity in excess of the requirements of the evaporator R, such excess quantity will accumulate in the refrigerant storage vessel 85, ready for immediate use upon an increased refrigerating demand, and if the liquid refrigerant builds up beyond the capacity provided in the storage vessel 85, it will overflow therefrom through the line 89 and pass directly into the rich absorption liquid in the receiver 58 of the absorber A, thereby further fortifying the rich absorption liquid.

This situation may arise under relatively light refrigeration demands during periods when relatively large amounts of heat are nevertheless being supplied to the generator G from the engine block 10 by the coil 40. In such instances, unusually large proportions of rich absorption liquid are consequently shifted from the receiver 58 of the absorber A to raise the liquid head in the annular chamber 74 of the collector L. As has been described, this shift takes place whenever high heat application to the generator G causes vaporization of increased amounts of refrigerant gas which separate in the accumulator K and pass through the pipe 72 to produce more active gas lift and elevate increased amounts of rich liquid into the chamber 74 of the collector L.

The increased volumes of refrigerant gas generated as above described are then required to be condensed in the condenser C with the resultant yield of liquefied refrigerant greater than the requirements of the evaporator R. Since the thermostatically controlled valve 87 passes only enough liquefied refrigerant to effect the desired cooling by the evaporator R, the remainder of the liquid refrigerant accumulates as a reserve in the vessel 85, and any excess over this reserve is returned by overflow to the rich absorption liquid in the receiver 58 as above stated. Since the refrigerant content of the rich absorption liquid is thereby increased, a correspondingly greater cooling effect is produced upon the contents of the coil 40, and hence upon the cooling liquid in the engine block 10, by any given volume of absorption liquid, due, of course, to greater heat absorption from the coil 40 upon vaporization of increased amounts of refrigerant gas in the generator G. Also a correspondingly greater gas lift effect is produced in the stand-pipe 70 in the collector L by the greater volume of gases generated. The result of these phases of the operation is the by-passing and recycling of substantial proportions of refrigerant for the sole purposes of cooling the coil 40 and effecting gas lift without performing any refrigerating effect in the evaporator R.

While the fluid employed for cooling the engine block 10 may be a liquid, such as water, which is circulated through the coil 40, or is circulated by way of the riser 33 into a conventional vented radiator provided with cooling coils 35 or the like, it is preferred that the cooling system be sealed, and that some constant boiling point liquid be employed whose boil-point is within the desired operating range. In the latter instance, the amount of constant boiling liquid employed will be such as to provide an operating level somewhere within the chamber 29 in the cylinder head 28, somewhat as indicated by the dotted line 43. When employing such a liquid, only vapors thereof are passed through the riser 33 and the line 41, these vapors being condensed into liquid in the condensing coils 35 and returned to the passages 30 in the engine block 10, while the vapors passing through the line 41 into the heating coil 40 will be condensed by reason of the transfer of heat to the absorption liquid in the generating container 44 for distilling off the refrigerant gas, the condensate returning through the line 41 to the cooling liquid passages 30 in the block 10. Water might be employed as a constant boiling point liquid, but ordinarily its boiling point probably would be too high. Therefore, known constant boiling mixtures of lower boiling point may be used, such as a water and secondary butyl alcohol mixture which contains about 27.3% water and 72.7% secondary butyl alcohol, and boils at 189.5° F., or a water and ethyl alcohol mixture which contains about 4.4% water and 95.6% alcohol, and boils at about 173° F.

As has also been previously indicated, the employment of hydrogen as a carrier gas in iron and steel parts is ordinarily objectionable because of the hydrogen loss by seepage through the pores of the metal. Since it is desirable to employ iron or steel in connection with at least some of the parts of the system, it is desired to employ a satisfactory substitute for hydrogen, helium being preferred. Due to its larger molecule, the helium loss is much less than that of hydrogen, and since its molecular weight is only about one-fourth that of ammonia, it is light enough to separate readily when ammonia is used as the refrigerant gas.

However, where employing helium as the carrier gas, it may be desirable, in view of its molecular weight, which is 4, to employ a refrigerant that is heavier than ammonia, the molecular weight of which is 17. For this purpose, an appropriate readily vaporizable material is monomethylamine, the molecular weight of which is 31 and the boiling point of which is about 20° F. In view of the relatively greater difference between the molecular weights of helium and monomethylamine than between helium and ammonia, gravity separation between the two gases in the system is facilitated.

Since many improvements of the generic invention here disclosed will be apparent to those skilled in the art, it is intended to reserve all such variations as fall within the scope of the appended claims.

I claim as my invention:

1. In combination in a vehicle: an internal combustion engine adapted to propel said vehicle and having hot fluid disposal means; a vertically extending chamber having an air intake at its bottom and an air vent at its top; refrigerant producing apparatus disposed in said chamber including a generator adapted to liberate refrigerant gas from a gas-containing absorption liquid in the generator; a compartment; a refrigerating element disposed in said compartment, said element being operatively connected with said apparatus to receive refrigerant therefrom; means connecting said hot fluid disposal means with said generator to supply heated fluid from said engine for liberating refrigerant gas from said absorption liquid; and an exhaust pipe connected with said engine for conveying exhaust gases, said pipe having an outlet disposed adjacent said air vent and adapted to induce a draft of cooling air through said chamber.

2. A method of refrigerating a compartment carried on a vehicle having a heat generating engine provided with a passage adapted to receive a cooling fluid, comprising: circulating a gas absorption liquid containing absorbed refrigerant gas in a gas-absorption refrigeration system; heating a portion of said system to liberate refrigerant gas by applying hot fluid from said passage of said engine to said portion of said system; separating said released refrigerant gas from the resultant hot lean absorption liquid; liquefying said refrigerant gas, said gas being liquefied by a draft of cooling air forced by an aspirator effect established by employing exhaust gases from said engine; and vaporizing the liquefied refrigerant in an evaporator in said compartment.

MARION F. KNOY.

REFERENCES CITED

The following references are of record in the file of this patent:

UNITED STATES PATENTS

| Number | Name | Date |
|---|---|---|
| 1,199,380 | Hiller | Sept. 26, 1916 |
| 1,791,441 | Bertsch | Feb. 3, 1931 |
| 1,897,223 | Altenkirch | Feb. 14, 1933 |
| 1,920,612 | Von Platen | Aug. 1, 1933 |
| 1,955,345 | Sarnmark | Apr. 17, 1934 |
| 1,985,636 | Foas | Dec. 25, 1934 |
| 2,009,067 | Mulholland | July 23, 1935 |
| 2,080,195 | Bergholm | May 11, 1937 |
| 2,138,777 | Zellhoefer | Nov. 29, 1938 |
| 2,142,960 | Zellhoefer | Jan. 3, 1939 |
| 2,181,376 | Lynger | Nov. 28, 1939 |
| 2,187,982 | Moncreif | Jan. 23, 1940 |
| 2,269,099 | Grubb | Jan. 6, 1942 |
| 2,316,792 | Irwin | Apr. 20, 1943 |

FOREIGN PATENTS

| Number | Country | Date |
|---|---|---|
| 676,408 | France | Feb. 22, 1930 |
| 693,689 | France | Nov. 24, 1930 |